June 2, 1970      W. F. KYRYLUK      3,514,942
SOLAR HEAT TRANSDUCER APPARATUS
Filed Feb. 14, 1968      3 Sheets-Sheet 1
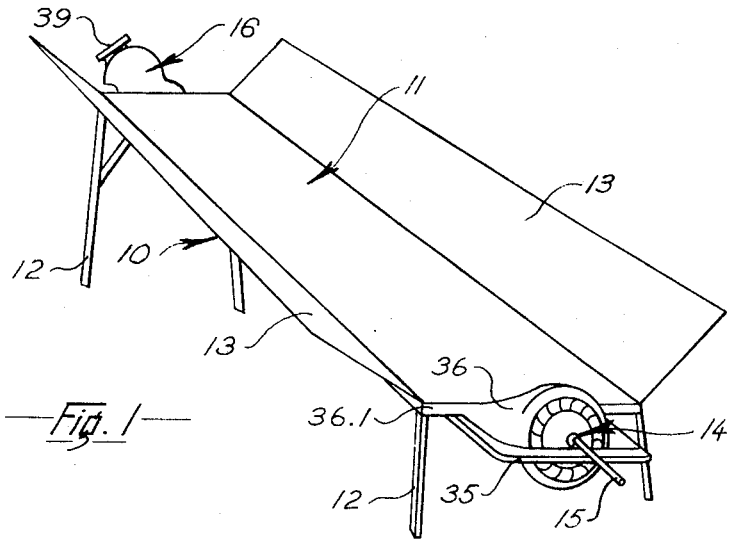
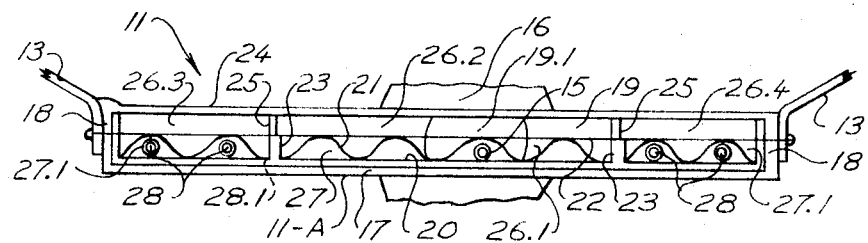
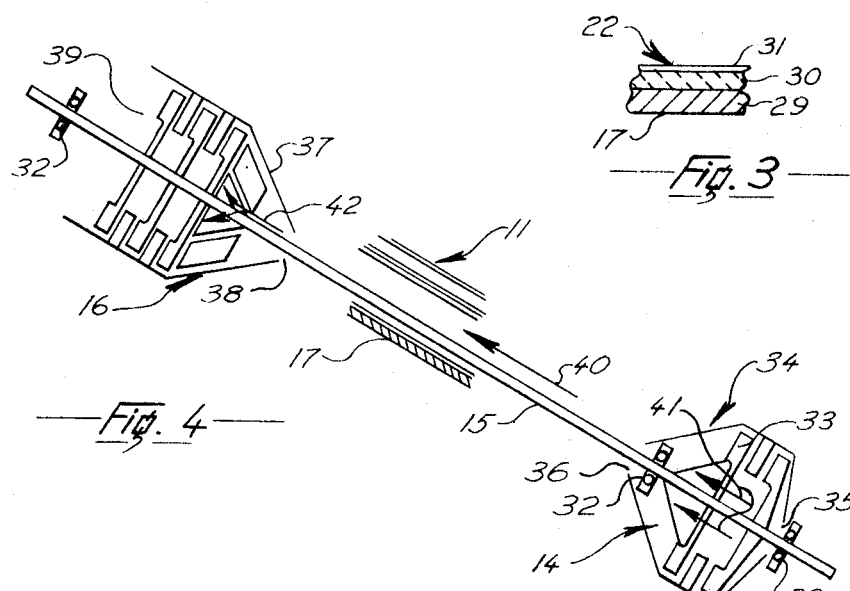
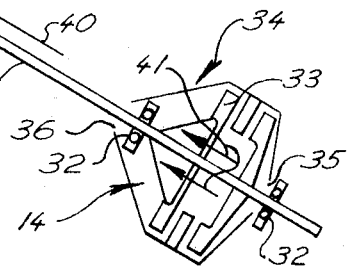
William F. Kyryluk,
Inventor
by Agent June 2, 1970  W. F. KYRYLUK  3,514,942
SOLAR HEAT TRANSDUCER APPARATUS
Filed Feb. 14, 1968  3 Sheets-Sheet 2
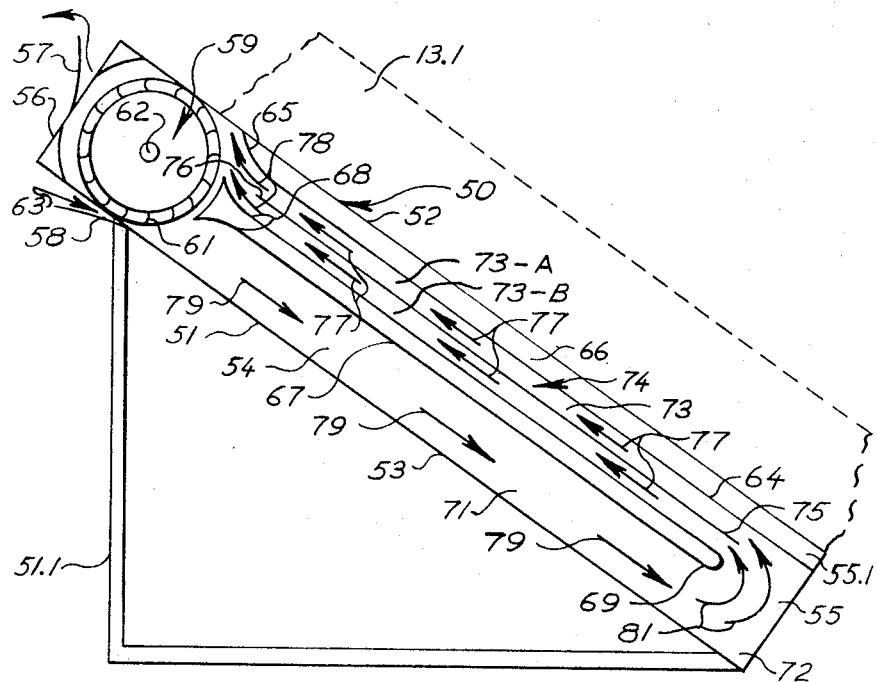
Fig. 5
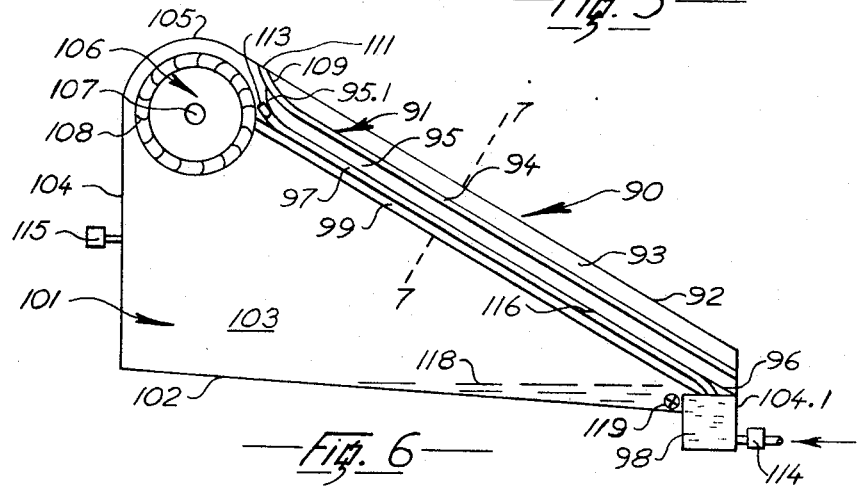
Fig. 6
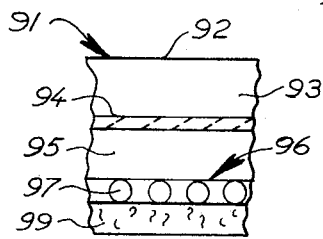
Fig. 7
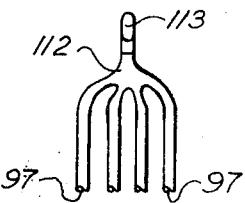
Fig. 8
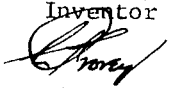
William F. Kyryluk, Inventor
by Agent United States Patent Office 3,514,942
Patented June 2, 1970

3,514,942
SOLAR HEAT TRANSDUCER APPARATUS
William F. Kyryluk, Apt. 704, 550 W. 12th,
Vancouver 10, British Columbia, Canada
Filed Feb. 14, 1968, Ser. No. 705,398
Claims priority, application Great Britain, Feb. 15, 1967,
7,206/67
Int. Cl. F03g 7/02
U.S. Cl. 60—26                                       8 Claims

ABSTRACT OF THE DISCLOSURE

A solar heater in which fluids such as air and water are heated in inclined elongated spaces by an absorption transformer and the heated air rising from one of the spaces drives a turbine.

BACKGROUND OF THE INVENTION

Field of the invention

The invention relates to a solar transducer having a transducer element transforming radiant energy from rays of the sun to supply other forms of energy, for instance motion, changing the state of a liquid to a gas, heating and evaporation.

Prior art

A solar motor is described and illustrated in my U.S. Pat. 3,137,125, and in my Canadian Pat. 738,796 corresponding generally thereto. A solar heat concentrator is described in my U.S. Pat. 3,279,457. An absorbent transformer, is described in each of the above patents. The present invention utilizes a transformer of that general type to transform radiant energy to other energy as above. Hereinafter an absorbent transformer as taught in these patents is referred to as an AT.

SUMMARY OF THE INVENTION

The invention provides solar heat transducer means including a transducer element having; an outer member of material transparent to solar radiant energy rays, suitably thin plastic sheeting; an absorbent transformer means which can be an AT as aforesaid, or other type of absorbent transformer. In combination with the above there is provided an enclosure, with a space defined between an inner side of the transducer and a wall of the enclosure, with fluid—that is a liquid, or a gas e.g. air, or a gas e.g. steam or water vapor from water heated by the transducer means, in the enclosure.

Alternative transducer structure is provided having a dead air space defined between the outer member and a spaced wall of material also transparent as aforesaid, suitably glass, with the absorbent transformer defining an inner wall of a space to be heated. In a further alternative the absorbent transformer is below the, suitably glass, wall within a space defined between a transverse insulating partition and the wall aforesaid. Still further alternatives slow thin wall tubing of a material of high thermal conductivity for instance copper. In additional structure conduction and/or convection is aided by corrugated conducting elements, or by plates, of high thermal conductivity to aid convection of the fluid.

In combination with a transducer element according to an alternative above, the invention provides a gas turbine driven by convection flow of heated gas, with the gas being air. A further turbine combination has a turbine as aforesaid, with a second or inlet turbine driven by the turbine first aforesaid and providing a compression effect so that the heated air attains a pressure greater than, otherwise, would be the case.

A still further gas turbine embodiment is provided where gas is low pressure steam from water heated as aforesaid, discharged being to an intergral condenser. Liquids other than water could be used e.g. alcohol.

As well, in combination with a transducer element according to an alternative above, a water heating tank is provided with the transducer element forming a wall of the tank.

A further embodiment provides a salt water still in which sea water is evaporated by heat from a transducer element as aforesaid, the water being contained in a shallow pan below and slightly spaced from the transducer. A sun facing condenser is cooled by ambient air, and convection flow aided by other ambient flow, carries moisture laden air from the space above the pan to the condenser in which a condensate of distilled water is formed.

DESCRIPTION OF THE DRAWINGS

FIG. 1 is a perspective sketch of air turbine embodiment of the invention,

FIG. 2 is a right section through a central element thereof,

FIG. 3 is a fragmented section of an AT,

FIG. 4 illustrates means of interconnection of inlet and outlet air turbines,

FIG. 5 is an elevation generally in section showing single turbine air turbine embodiment, FIG. 6 is an elevation generally in section showing a steam turbine embodiment, FIG. 7 is a section on 7—7 FIG. 6, FIG. 8 is a detail showing copper tube header and nozzle arrangement.

Figure 9:
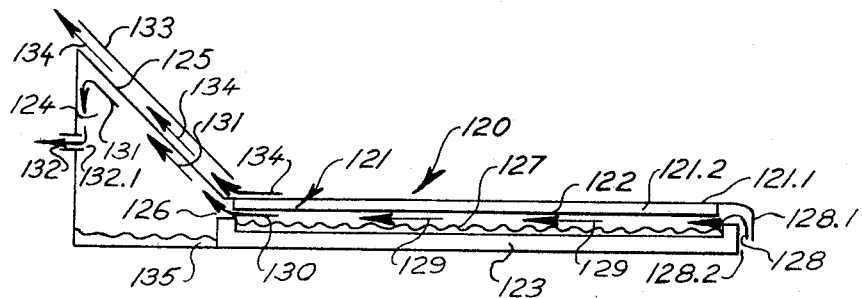
FIG. 9 is a solar salt water still.

All of the figures are diagrammatic with section hatching generally omitted for clarity of illustration.

PREFERRED EMBODIMENTS

Preferred embodiments of the invention are now described with reference to the drawings. It is to be understood that the embodiments described are exemplary, and that the invention is capable of expression in structure other than that particularly described illustrated.

GAS TURBINE

Broad description, FIG. 1

FIG. 1 exemplifies one form of solar transducer apparatus wherein the fluid is the gas air, heating of which by the sun causes convection flow which is utilized to impart motion to a turbine rotor. In FIG. 1, the apparatus, designated generally 10, has a central transducer element 11 obviously supported in an inclined position by legs 12 of a frame of the apparatus, suitable leg adjustment means being provided for the purpose of varying the inclination of the central element. Wing deflectors 13 can be provided along side edges of the central transducer element 11, the deflectors having inner surfaces adjacent the central element and being adapted to reflect a part of the radiant energy falling upon them to the said central element. The wings desirably are hinged to the transducer element, so as to be adjustable.

External of a lower edge of the inclined central element is an inlet turbine indicated generally at 14, which turbine has a shaft 15 extending through the central element to an outlet turbine 16 at an upper edge of the sloping element, the shaft 15 being common to both turbines.

Description of FIGS. 2 and 3

As shown in the diagrammatic section FIG. 2, the central transducer element 11 has a shallow open box-like enclosure 11–A having a bottom wall 17, side walls 18, and lower and upper end walls of which the upper end wall only is seen in FIG. 2, and is designated 19, the said upper end wall having an opening 19.1 for passage of air to the outlet turbine 16. The common shaft 15 is disposed generally centrally of the enclosure 11–A as shown. The walls aforesaid, and particularly the bottom wall 17, are of material having low thermal conductivity, for instance plywood or fibre glass with an internal layer of reflective insulating material 20. Thin corrugated copper sheeting 21 is obviously secured to the bottom wall 17 and an AT 22 is obviously secured to longitudinal slats 23 so that the AT is disposed at tops of the corrugation of the sheet 21 occupying about one-half of the depth of the enclosure 11–A. An outer transparent member 24 forms a top of the shallow enclosure 11–A, which member is of material transparent to radiant energy of the sun's rays. The top member is spaced from the AT and additionaly supported by transparent wall members 25 preferably disposed above the slats 23 as shown.

It is seen that the upper longitudinal flow spaces 26.1 are defined between the AT and corrugations of the corrugated sheet 21, and that lower longitudinal flow spaces 27 are also defined between the corrugations and the bottom wall 17. A fluid space 26.2, rectangular in section is defined by the AT, the top member 24, and the wall members 25.

Referring to FIG. 3, the AT 22 has a thickness which can be as little as fifteen or twenty microns. An inner layer 29 of the AT is disposed downwards facing the bottom wall 17, and is of aluminium of the thinnest gauge readily available commercially. A central layer 30 in contact with and above the bottom layer 29 is a mixture of the following materials in the proportion shown:

| | Parts |
|---|---|
| Powdered carbon | 2 |
| Lamp black | 1 |
| Metal lacquer | 4 |

An emulsion made by mixing the above materials is applied evenly to the bottom layer 29, for instance with a fine paint brush. The upper layer 31 can be a varnish, lacquer, enamel, or plastic, applied as a thin spray.

Description of FIG. 4, and further reference to FIGS. 1 and 2

Referring now to FIG. 4 the common shaft 15 is suitably journalled in spaced bearings 32, the bearings being secured in a fixed part of the unit. A rotor of the inlet turbine 14 is secured to the shaft 15, the rotor having blades 33. The turbine has a housing 34 having an inlet 35, and an outlet 36, for flow of air through the turbine. As best seen in FIG. 1, the outlet communicates through the lower end wall of the shallow box, referenced 36.1 in FIG. 1, to the longitudinal spaces 26.1, 27, and the space 26.2 of FIG. 2. The outlet turbine 16 has a housing 37, having an inlet 38 similarly communicating with the air spaces through the opening 19.1 of the upper end wall 19, the housing having an outlet 39.

Operation

The solar motor unit operates as follows. Sun rays striking the inclined AT of the transducer element 11 result in air in the air spaces being heated, thus moving upward by convection, as indicated by an arrow 40 FIG. 4. Accordingly air will enter the inlet turbine 14 through the inlet 35 impinging upon the blades 33 as indicated by an arrow 41, so causing the shaft 15 to revolve. The air, continuing its upward flow as indicated by the arrow 40 will pass to the inlet 38 of the outlet turbine 16 thence through the blades thereof as indicated by arrows 42, also causing the shaft 15 to rotate, it being understood that upper and lower turbines have blades so disposed that the passage of air as aforesaid will cause each to rotate in the same direction.

It is seen that convection flow of air through the flow spaces causes rotation of the shaft 15 so as to provide a power unit.

To those skilled in the art, it will be apparent that, in addition to a convection effect which would cause air to flow through the flow spaces if the inlet turbine were not present, with the inlet turbine there is additionally a compression effect generally analogous to in principle to that of a compressor of a jet engine. This effect tends to provide greater utilization of the total radiant energy received by the transducer element 11.

Referring now to FIG. 2 it is seen that spaces are defined between the longitudinal members 25 and the side walls 18 which spaces are designated 26.3 and 26.4. These spaces, and spaces defined by corrugations of the sheet 21, the longitudinal slats 23, and the side walls 18 as designated 27.1, are dead air spaces. That is to say, airflow as above described does not here occur. In the configuration shown in FIG. 2, thin wall copper tubing 28 is placed in the lower of the spaces designated 27.1, thus water within the tubing will be heated, and convection flow of the heated water can take place, thus providing water heating means—obvious structure ancillary thereto not being shown. When water is not to be heated, then the energy collected in these spaces can be conducted by step down conduction means as described in my U.S. Pat. 3,279,457 into the central transducer 11 for additional heating of the air.

SINGLE GAS TURBINE TRANSDUCER, FIG. 5

In FIG. 5 transducer structure indicated generally by the numeral 50 has a shallow enclosure 51 with a top 52 later described, a bottom wall 53, side walls 54 of which only one is seen in FIG. 5, a lower end wall 55 and an upper end wall 56, the enclosure suitably being rectangular in cross section. The upper end wall 56 has an exhaust outlet port 57, and the bottom wall 53 has an intake port 58 adjacent a junction of the bottom wall with the top wall as is later described in detail. A turbine 59 has a rotor including blades 61, with the rotor secured to a shaft 62 obviously journalled in the enclosure side walls 54. The rotor has an outside diameter according to a distance between the top and bottom walls 52 and 53 with the shaft 62 being located so that blades of the rotor are clear of the upper end wall 56 as shown. The intake port 58 is positioned close to the said point of nearest approach of the rotor blades to the bottom wall so that air entering as shown by an arrow 63 will impinge upon the vanes. The enclosure 51 is supported in an inclined position by obvious framework 51.1, and means (not shown) can be provided to alter the inclination of the enclosure 51, and to orient it to a position favourable for receiving rays of the sun.

The top 52 is of transparent plastic sheeting as before described with reference to the transparent member 24 FIG. 2, and a glass wall 64 extends from the lower end wall 55 parallel to and spaced from the top wall 52, the glass wall having an inclined upper closure 65 extending from an upper end of the glass wall 64 to the top 52 as shown, so that a dead air space is defined between the top wall 52, the glass wall portions 64 and 65, and a portion of the bottom wall designated 55.1. A transverse partition 67 extends generally central of the enclosure 51 from an upper end 68 to a lower end 69, the lower end being spaced from the bottom wall 55. The transverse partition extends upwards from its lower end 69 to the upper end 68, with the upper end curved and of increased thickness as shown. The transverse partition 67 being secured to the side walls 54, a lower air space 71 is defined between the partition and the bottom wall 53, which space extends around the lower end 69 of the transverse partition, so that a lower end space 72 is defined between the lower end of the partition and the lower end 55. An upper air space 73 is similarly defined between an upper side of the transverse partition and a lower side of the glass wall 64. An AT 74, generally as before described with particular reference to FIG. 3 is disposed parallel to the transverse partition 67 and the glass wall 64, generally central of the space 73, with a lower end 75 of the AT spaced from the lower end wall 55 as is the lower end 69 of the transverse partition, the AT extending upwards to an upper end 76 spaced clear of the blades 61 of the turbine as shown. The AT thus divides the upper air space 73 providing a space 73-A above the AT and a space 73-B below it.

Operation of the FIG. 5 device

Reflectors, generally as the reflectors 13 in FIG. 1 can be provided, one reflector 13.1 is indicated in FIG. 5 in broken outline. With rays of the sun incident upon the transparent plastic top 52 the rays will pass through the dead air space 66, the glass wall 64, to strike the AT 74. This will cause air in the space 73-A above the AT and in the space 73-B below it to heat, accordingly the heated air will flow as indicated by arrows 77 upwards to impinge upon the blades 61 of the rotor as indicated by arrows 78 thus causing the shaft 62 to revolve. Exhaust air will be discharged through the exhaust port 57 with cold air entering as indicated by the arrow 63 through the intake port 58 to flow downwards as indicated by arrows 79 circulating through the lower end space 72 as shown by arrows 81, thence to flow upwards through the spaces 73-A and 73-B. Optimum results are obtained when the transverse partition 67 is a thermal insulator, since a material temperature difference exists on opposite sides thereof.

Air circulating as aforesaid by convection will cause the rotor to rotate, as has been explained, with power being taken from the shaft 62 by obvious means not shown. Since the rotor of the turbine is driven, there will be tendency for reduced air pressure in the vicinity of intake port 58 from this cause, as well as from the convection flow of the air, and rotation of the turbine will then tend to drive the entering cold air in downwards as shown by the arrows 79. It has been stated that upper ends 68 of the central partition of the transverse partition 67 are enlarged, this is to provide better aerodynamic shape for the air passages.

It is further to be understood that airflow passages generally, while shown in the diagrammetric figures for ease of illustration, as including sharp corners, are obviously shaped according to known practice to facilitate flow.

In the embodiment of FIGS. 1-4, and in the embodiment of FIG. 5, a flow of air is by convection with that flow augmented by the turbine 59 in the FIG. 5 embodiment, and by the lower turbine in the FIG. 1 embodiment. In both of these embodiments the operating fluid namely air, changes in density but not in state.

Description of FIGS. 6, 7, and 8

FIGS. 6 and 7 exemplify an alternative form of solar transducer apparatus including a gas turbine, the gas resulting from a change of state of the fluid, for instance water and steam arising from a change of state of the water with increasing temperature thereof.

Apparatus indicated generally 90 has an inclined transducer element substantially as before described. The transducer element has a transparent plastic sheet top wall 92, a dead air space 93 beneath the top wall, a transverse glass wall 94, a lower dead air space 95 beneath the glass wall, an AT 96 defining a lower side of the space 95. Beneath the AT and in contact with an underside thereof there are a plurality of thin wall copper tubes 97 the tubes communicating with the manifold 98 at their lower ends.

A tank enclosure 101 has a bottom wall 102 and generally triangular end walls 103 of which only one is seen in FIG. 6, a back wall 104, a curved top wall portion 105 forming a part of a housing for a turbine 106 having a shaft 107 journalled in the side walls aforesaid, the turbine having a rotor with blades 108. The bottom wall 102 slopes slightly downward from the back wall 104 to the manifold 98, the manifold being disposed at a lower apex formed by the side walls and the base as shown in FIG. 6. The slope of the bottom wall is suitably say 5°, and is not critical. The transverse glass wall has an upper portion 109 curved to join the top wall portion 105 as seen at 111, the said portion 109 forming a continuation of the turbine housing. A closure 95.1 forms a top wall of the dead air space 95, a lower end wall being a part of an apex, or front, wall, 104.1.

As seen in FIG. 8, upper ends of the spaced copper tubes 97 join to one another as shown at 112 being connected to a nozzle 113. A liquid inlet valve 114 is connected to a water supply source not shown. When the valve 114 is open water from the supply will enter the manifold 98, and when the said manifold is full, rise in the copper tubes 97. The tank enclosure 101 of which the glass wall 95 forms a part is air tight, a relief valve 115 being provided.

Operation

Rays of the sun impinging upon the transducer element 91 will cause water contained in the tubes 97 to reach a boiling point.

The relief valve 115 is set—suitably at two or three pounds above atmospheric. Water in the tubes can be, for instance, at a level 116 when steam will occupy a space above the tube water level.

The steam will discharge through the nozzle 113 impinging upon the turbine blades 108 causing the shaft 107 to rotate. With expansion of the steam passing through the nozzle, pressure and temperature will drop, accordingly condensate will form and water will collect at the bottom of the tank as seen at 118. Normally open valve means 119 are provided to drain off the condensate.

Under ordinary operating conditions pressure in the tank 101 can be somewhat above atmospheric (water being at a level 118) notwithstanding the pressure drop aforesaid. Thus the water will be urged out, and can be drained out by gravity alone when the apparatus is not operating—with the relief valve 115 opened if necessary. Pressure in the tank, which is a condenser means, is thus maintained lower than pressure of the steam entering the nozzle 113.

SOLAR STILL

FIG. 6 embodiment as a still

In the embodiment as shown in FIG. 6, if the liquid used were salt water, the condensate would be distilled water that is to say free of salt, and a supply could be obtained from the outlet valve 119. There would still be condensate whether or not the turbine 106 were present, however such an arrangement would have apparent disadvantages, such as for instance salt deposits in the tubes 97.

Description of FIG. 9

Solar still apparatus as shown diagrammatically in FIG. 9 is indicated generally by the numeral 120. The apparatus has a transducer element 121 generally similar to the transducer elements hereinbefore described, including an upper transparent sheet 121.1, a dead air space 121.2 defined by an underside of the transparent sheet and an upper side of an AT 122, the latter being spaced above a tray 123. Along one side edge of the tray a condenser chamber 124 is provided, this should face against the sun. The chamber is generally triangular in section and having a sloping upper wall 125. The apparatus should be oriented as shown namely with the condenser 124 along an edge of the tray opposite the sun, i.e. generally North. The condenser communicates with the space between the lower side of the AT and the tray through a longitudinal slot passage as indicated at 126.

With salt water 127 in the tray, air between the AT and the water will heat, an edge element adjacent the outer end of the transducer being bent downwards as seen at 128.1 so that the air enters a slot 128.2, thus currents will flow as indicated by arrows 128–132. The arrow 130 indicates flow into the apparatus through the slot 126, defined by a container of the tray and the underside of the AT, the flow of air passing outwards as shown by the arrow 132 through a long narrow horizontal slot, higher than the slot 128.2 aforesaid, as indicated at 132.1, in a vertical side wall of the condenser spaced above the maximum level of the condensate 135. A deflector plate 133 is spaced from and parallel to the sloping upper wall 125 of the condenser, thus ambient air can flow between the deflector plate and the sloping condenser wall as indicated by arrows 134, thus aiding cooling and condensation. Since the condenser faces away from and because it is not heated by transducer structure, temperature in the condenser is lower than the air temperature in the vicinity of the AT.

It is seen that the salt water 127 will vaporize, and in expanding through the slot 126 to the condenser 124 will cool discharging its moisture which will form a condensate 135 which will collect at the bottom of the condenser, and can be removed in any convenient manner.

The AT should be close to the surface of the salt water 127, with a one foot unit a suitable spacing is an eighth of an inch, which spacing can be increased to a quarter of an inch for a two foot unit. The tray is desirably removable so that the salt deposit may be cleaned out, the tray may be filled with water when it is removed from the apparatus or it can be filled in place by obvious means not shown. The still will function if generally oriented other than as shown, but effectiveness is reduced by material department from such position.

SOLAR TRANSDUCER WATER STORAGE TANK

Water heating accomplished in the FIG. 1 embodiment

In the FIG. 1 embodiment, it was shown how water in the copper tubes 28 could be heated.

Figure 10:
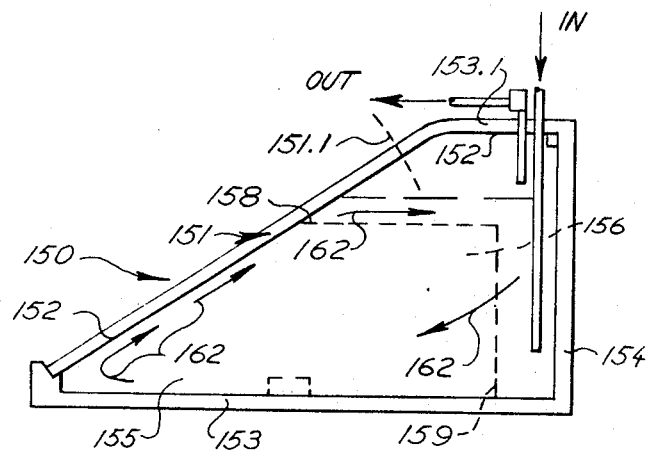
FIG. 10 is an elevation generally sectioned of a hot water tank embodiment.
Figure 11:
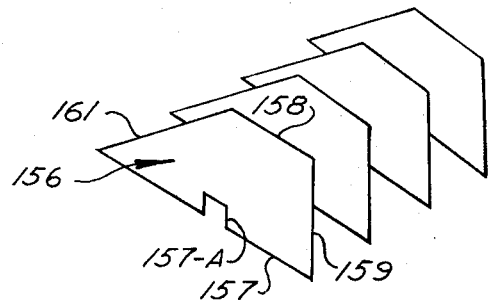
FIG. 11 is a perspective of an assembly of trapezium conducting plates.

Description of FIGS. 10 and 11

A hot water storage tank apparatus is indicated generally by the number 150. A sloping transducer element 151 which can be substantially as described with reference for instance to FIG. 9, is designated generally 151 has AT 152 forming an underside thereof. The tank has a bottom wall 153, a back wall 154, side walls 155 of which only one is seen in FIG. 10, the remaining wall of the tank being the transducer element 151. The transducer element can have an upper side edge 151.1 as indicated by a broken line—or can extend upwards forming a top wall of the tank which, as shown, is trapezium shaped in section. Triangular or other shape could be adopted. Heating effect of the transducer element 151 will cause convection currents of water within the tank, the currents being as indicated by a series of arrows 162.

In FIG. 11, the numeral 156 indicates generally a trapezium shaped conducting plate having a bottom edge 157, a top edge 158 parallel thereto, a back edge 159 which can be at right angles to the top and bottom edges aforesaid, and a sloping edge 161. The bottom edge has a rectangular flow opening 157–A. The effectiveness of the apparatus is increased by placing at least one plate 156 within the tank with its bottom edge 157 resting upon the bottom wall 153 of the tank, and with its sloping edge 161 resting against the transducer element 151. As shown in FIG. 10 in broken outline, the back edge 159 need not extend fully to the back wall 154 of the tank but can be adjacent thereto as shown. There is a temperature gradient in the plate, temperature difference between the water and the conducting plate is least on the edge 159, and little advantage is obtained by extending the tank wall 154. The top edge 158 of the conducting plate shown in broken outline in FIG. 10, is adjacent a top of the tank, for similar reasons since the water temperature gradient is upwards.

The bottom wall, back wall, and side walls, of the tank are insulated, as is the top wall at 153.1—if the transducer top edge is at 151.1.

The tank may be connected in the same manner as is an ordinary domestic hot water heater, which connections are indicated in FIG. 10 by arrows marked IN and OUT. Means of connecting the tank and arranging internal piping thereof are well known to those skilled in the art.

What is claimed is:

1. Solar heat transducer means having an enclosure, the transducer means including in combination,
    (a) a transducer element with an outer member transparent to solar radiant energy rays, and an absorbent transformer means spaced from and generally parallel to the outer transparent member,
    (b) a longitudinal fluid space defined between an inner side of the transducer element and a wall of the enclosure,
    (c) a gas, namely air, within the enclosure, constructed and arranged for the air to be heated by the absorbent transformer means,
    (d) the transducer element being inclined so that the heated air flows by convection from a lower end of the longitudinal space to an upper end thereof,
    (e) an air turbine at an upper end of the longitudinal space the turbine having a shaft, and means directing air flowing from the upper end of the longitudinal space to impinge against blades of a rotor of the turbine causing rotation of the shaft,
    (f) the shaft extending through the lower end of the fluid longitudinal space, and a rotor of an inlet turbine secured to a lower end of the shaft,
    (g) the turbine at the lower end of the longitudinal fluid space having an inlet port, with atmospheric air entering the inlet port impinging upon blades of the inlet turbine rotor to tend to rotate it in the same direction as rotation imparted as aforesaid by the shaft, the atmospheric air passing through the inlet turbine to the fluid space.

2. Structure as defined in claim 1, wherein thin corrugated metal sheeting of high thermal conductivity is disposed within the longitudinal fluid space defining upper and lower longitudinal flow spaces therein.

3. Structure as defined in claim 2 and reflective insulating means being provided on a lower wall of the enclosure.

4. Structure as defined in claim 3, a wing deflector along a side edge of the transducer element.

5. Structure as defined in claim 2, the enclosure having a wall, a longitudinal slat spaced from and parallel to the said wall defining a dead air space, with the absorption transformer extending to the said wall and a thin wall tube of high thermal conductivity within the dead air space—defined by the wall and slat, and water within the tube.

6. Structure as defined in claim 2 the enclosure having a wall, a slat spaced from and parallel to the said wall defining a dead air space, with the absorption transformer extending to the said wall, step down conduction means conducting heat from the dead air space to the flow spaces aforesaid.

7. Structure as defined in claim 3 the enclosure having a wall, a slat spaced from and parallel to the said wall defining a dead air space with the absorption transformer extending to the said wall, and a thin wall tube of high thermal conductivity within the air space, and water within the tube.

8. Structure as defined in claim 3 wherein thin corrugated metal sheeting of high thermal conductivity is disposed within the longitudinal fluid space defining upper and lower longitudinal flow spaces therein.

References Cited

UNITED STATES PATENTS

| | | | |
|---|---|---|---|
| 3,215,134 | 11/1965 | Thomason | 126—271 |
| 3,412,728 | 11/1968 | Thomason | 126—270 |

FOREIGN PATENTS

| | | |
|---|---|---|
| 8,711 | 4/1896 | Great Britain. |
| 369,199 | 11/1906 | France. |

CARROLL B. DORITY, JR., Primary Examiner

U.S. Cl. X.R.

126—271; 202—234